United States Patent
Scarpa

[11] Patent Number: 5,866,823
[45] Date of Patent: *Feb. 2, 1999

[54] COMMUTATING ELECTRODE MAGNETIC FLOWMETER

[75] Inventor: Thomas J. Scarpa, Edinboro, Pa.

[73] Assignee: Hersey Measurement Company, Spartanburg, S.C.

[*] Notice: The term of this patent shall not extend beyond the expiration date of Pat. No. 5,551,306.

[21] Appl. No.: 854,981

[22] Filed: May 13, 1997

[51] Int. Cl.$^6$ ...................................................... G01F 1/00
[52] U.S. Cl. ..................................... 73/861.16; 73/861.17
[58] Field of Search ........................... 73/861.11, 861.12, 73/861.13, 861.15, 861.16, 861.17

[56] References Cited

U.S. PATENT DOCUMENTS

| | | | |
|---|---|---|---|
| 2,722,122 | 11/1955 | Soffel | 73/194 |
| 2,766,621 | 10/1956 | Raynsford et al. | 73/794 |
| 3,942,377 | 3/1976 | Ginzburg et al. | 73/194 |
| 3,965,738 | 6/1976 | Watanabe | 73/194 |
| 4,236,410 | 12/1980 | Appel et al. | 73/861.12 |
| 4,325,261 | 4/1982 | Reund, Jr. et al. | 73/861.12 |
| 4,346,604 | 8/1982 | Snook et al. | 73/861 |
| 4,459,858 | 7/1984 | Marsh | 73/861.12 |
| 4,722,231 | 2/1988 | Tanaka et al. | 73/861.12 |
| 5,551,306 | 9/1996 | Scarpa | 73/861.16 |
| 5,677,496 | 10/1997 | Mochizuki | 73/861.16 |

OTHER PUBLICATIONS

Instruments Society of America, "Effects of the Inner Wall Conductivity of Adjacent Connecting Pipes on the Signal of Magnetic Flowmeters" pp. 1181–1192.

Thomas J. Scarpa, ISA, "Flow Velocity Profiles".

*Primary Examiner*—Ronald L. Biegel
*Attorney, Agent, or Firm*—Needle & Rosenberg, P.C.

[57] ABSTRACT

A flowmeter for measuring the velocity of a fluid employs a circuit for producing a magnetic field transverse to the direction of fluid velocity, thereby inducing a voltage potential in the fluid. At least two electrodes, in electrical contact with the fluid and spaced apart along a line transverse to the direction of the magnetic field and transverse to the direction of the fluid velocity, are responsive to the induced voltage potential. A signal processing circuit, that is responsive to the two electrodes, generates a velocity signal representative of the magnitude of the velocity of the fluid. A circuit periodically grounds the two electrodes, thereby eliminating any residual charge that builds up on the electrodes.

20 Claims, 7 Drawing Sheets

COMMUTATING ELECTRODE MAGNETIC FLOWMETER

BACKGROUND OF THE INVENTION

1. Field of the Invention

The present invention relates in general to magnetic flowmeters and in particular to an magnetic flowmeter having an improved arrangement of electrodes and inner wall insulation of the flow tube.

2. The Prior Art

There are several types of flowmeters used to measure the flow rate of a fluid in pipe or tube. Mechanical displacement flowmeters include an element, such as a screw or wheel, which is moved by the liquid and in turn moves dials or other indicators. This type of flowmeter is typically used in residential water meters.

Magnetic flowmeters, on the other hand, expose a flowing fluid to a magnetic field thereby inducing a voltage potential across the fluid. The induced potential is perpendicular to both the direction of the magnetic field and the direction of the fluid flow. Methods and apparatus have been well established in the prior art for measuring the flow of electrically conductive liquids in closed conduits by passing them through a magnetic field and detecting the voltage induced in a pair of electrodes at right angles to both the flow direction and the magnetic field in accordance with Faraday's Law of Induction. When the flowing conductive liquid in the conduit intersects the magnetic field, an induced signal is transferred to the electrodes.

Faraday's Law, upon which the designs of all magnetic flowmeters are based, shows that there is a linear relationship between the average velocity of a conductive liquid moving through a uniform magnetic field and the voltage induced in a pair of electrodes at right angles to both the liquid and the field. It is stated as $E = K \times B \times D \times V$, where $E$ is the generated voltage, $K$ is a constant of proportionality, $B$ is the magnetic field strength, $D$ is the distance separating the electrodes, and $V$ is the average velocity of the conductive liquid.

A magnetic flowmeter typically has a flow tube, through which a fluid flows, that terminates at each end with a flange. The flanges are used to integrate the flowmeter into a piping system. Between the flanges is a flow sensing unit, which subjects the fluid to a magnetic field. The sensing unit also measures the voltage potential difference, induced in the fluid by the fluid flowing through the magnetic field, between two sense electrodes. A frame of reference—usually a ground or earth potential—is required before the measurement of potential difference between the sense electrodes can be made meaningful. In fact, improper grounding considerations have long been a major cause of field installation problems with conventional magnetic flowmeters.

The inner surface of the flow tube must be insulated from the fluid to prevent the tube from grounding the induced potential difference. Because the inner surface of the flow tube is insulated from the fluid, ground connections generally are made to the conductive liquid by either grounding at least one of the entrance and exit flanges, or by installing special "grounding rings" at one or both of these locations. Common practice is to use two ground connections, either at the flanges or with grounding rings, at both ends of the flow tube, to provide electrostatic symmetry both upstream and downstream from the sense electrodes.

However, grounding at the remote entrance and exit flanges does not always provide adequate reduction in induced spurious electrical noise signals, which in some cases can destroy the reliable operation of the flowmeter. This problem is caused primarily because the physical placement of the actual ground reference points contributes substantially to the reliability of the measurement. The electrical resistance of the liquids generally encountered is not very low, and a high resistance ground return path can pick up a substantial amount of spurious electrical noise sufficient to swamp or substantially degrade the desired signal from the sense electrodes. Indeed, in practical installations, the spurious signals generated by electrolytic interaction between the conductive liquids and the electrodes, as well as signals originating from other sources, often totally mask the desired flow signal so as to render a permanent magnet system totally inoperative.

To avoid the spurious noise problem, it has been necessary to use electromagnetic coils excited by a pulsed DC system to periodically switch the magnetic field on and off, rather than to employ permanent magnets and a steady state magnetic field. The switching of the magnetic field of the coils permits sampling of spurious noise signals during both the on and off periods, thereby enabling the cancellation of spurious noise from the desired flow signal via differential subtraction circuitry.

A major disadvantage of the pulsed, electromagnetic field coil system is the requirement of a substantial power supply to furnish the field excitation. Present day electronic circuitry is capable of furnishing the required amplification and signal conditioning of the flow signal into meaningful measurements by employing only micropower. As a result, well up to 99 percent of the power supply requirements for an electromagnetic flowmeter can be consumed by the field coil excitation system alone. Furthermore, pulsed flowmeters must alternate between sampling induced voltage and background voltage. Therefore, they cannot monitor flow continuously.

U.S. Pat. No. 4,722,231, issued to Tanaka et al., shows a ground rod, instead of grounding rings, mounted no closer to the axis of the flow tube than one of the excitation coils, to provide direct ground contact with the flowing liquid. Although the ground rod is mounted in the same circumferential cross sectional plane as the pair of sensing electrodes it does not lead to a balanced distribution of the measured electrostatic field since it is used at only one side of the pipe.

U.S. Pat. No. 2,766,621, issued to Raynsford et al., shows an arrangement whereby two ground electrodes are located in the same plane as the sense electrodes. However, both the ground electrodes are permanently grounded to the shields of the connecting cables to the sense electrodes. In addition, they are also grounded to the flow tube itself, which eliminates the possibility of employing a Kelvin ground method to eliminate ground loop currents that can become non-common mode signals incapable of being eliminated from interfering with the desired flow signal. This also permanently affixes their function as being ground electrodes only, and does not permit their being switched to function as sense electrodes.

U.S. Pat. No. 3,965,738, issued to Watanabe, shows a pulsed D.C. method for exciting electromagnetic field coils, wherein the flow signal, in addition to spurious electrical noise, is sensed when the field is on, and spurious electrical noise only is sensed when the field is off, the latter to provide a noise adaptive zero, reference to be canceled by subtraction, to provide a noise insensitive flow reading. This method can only be used with electromagnetic excitation since the field generated by permanent magnets cannot effectively be switched off during a noise sensing mode.

U.S. Pat. No. 4,325,261, issued to Freund, Jr. et al., shows a method for ensuring constancy of electromagnetic field excitation by employing a fixed reference voltage in comparison to a voltage indicative of the current flow through the field coils, to compensate for variations within the field coil inductance. This method indirectly infers a relative measurement of the gauss field rather than directly quantifying the value of that field and cannot be used at all if permanent magnets are employed.

U.S. Pat. No. 4,459,858, issued to Marsh, shows a flowmeter having an electromagnetic sensor probe consisting of an inductance coil in combination with a plurality of electrodes serving as sense and reference ground. This method shows no means for noise cancellation unless a pulsed D.C. method as described by Watanabe is employed, in which case permanent magnets could not be utilized.

One disadvantage found in typical prior art magnetic flowmeters is that they lack any way of discharging residual charge that builds up on the sensing electrodes caused by friction of the fluids passing over the electrodes. This problem can lead to inaccurate velocity readings as the residual charge influences the potential sensed across the electrodes.

BRIEF SUMMARY OF THE INVENTION

The present invention is a flowmeter for measuring the velocity of a fluid. In one aspect, the invention employs a circuit for producing a magnetic field transverse to the direction of fluid velocity, thereby inducing a voltage potential in the fluid. At least two electrodes, in electrical contact with the fluid and spaced apart along a line transverse to the direction of the magnetic field and transverse to the direction of the fluid velocity, are responsive to the induced voltage potential. A signal processing circuit, that is responsive to the two electrodes, generates a velocity signal representative of the magnitude of the velocity of the fluid. A circuit periodically grounds the two electrodes, thereby eliminating any residual charge that builds up on the electrodes.

Another aspect of the invention is a magnetic flowmeter comprising magnets (which could be either permanent magnets or electromagnets) for producing a magnetic field transverse to the direction of fluid velocity (preferably essentially perpendicular to the direction of fluid velocity) thereby inducing a voltage potential in the fluid. Two primary electrodes in electrical contact with the fluid, spaced apart along a line transverse to the direction of the magnetic field and transverse to the direction of the fluid velocity (preferably, essentially perpendicular to the direction of the magnetic field and perpendicular to the direction of the fluid velocity) are responsive to both the induced voltage potential and a background voltage across the fluid. Two secondary electrodes in electrical contact with the fluid, spaced apart along a plane parallel to the direction of the magnetic field and parallel to the direction of the fluid velocity are responsive to the background voltage across the fluid. The secondary electrodes are disposed either on a line parallel to the direction of the fluid velocity, or on a line parallel to the direction of the magnetic field. An additional circuit is provided for periodically grounding the electrodes, thereby eliminating any residual charge that builds up on the electrodes.

The secondary electrodes sense any background voltage potentials in the fluid. The potentials sensed by the primary electrodes and the secondary electrodes are input to a signal processor, The signal processor subtracts the background potential, sensed by the secondary electrodes, from the total potential, sensed by the primary electrodes, with the result being the potential induced by the fluid flowing through the magnetic field. The induced voltage is proportional to the velocity of the fluid.

The signal processor, responsive to the primary and secondary electrodes, generates the velocity signal representative of the magnitude of the velocity of the fluid. A magnetic sensor generates a signal representative of the magnitude of the magnetic field across the fluid. A means in the signal processing means, responsive to the magnetic sensor means, corrects the velocity signal for any fluctuations in the magnetic field.

In another aspect of the invention, the magnetic field generating means comprises two spaced-apart electromagnetic coils each having a common axis and the same current with the fluid flowing between the coils. The same current can be assured by connecting the coils in series. Ideally, the coils are separated by a distance of about the radius of one of the coils. In another preferred embodiment, the magnetic field generating means comprises two spaced-apart permanent magnets with the fluid flowing between the magnets. For use with low voltage, high current power supplies, the coils can be connected in parallel such that their respective magnetic fields do not cancel each other out.

In yet another aspect of the invention, employing four magnets, the magnetic field generating means comprises a first pair of spaced-apart electromagnetic coils and a second pair of spaced-apart electromagnetic coils. The coils are oriented so that a magnetic field generated by the second pair of coils is perpendicular to the magnetic field generated by the first pair of coils and the direction of the fluid velocity is perpendicular to the magnetic fields generated by both the first pair of coils and the second pair of coils. A switching means is provided in this embodiment to alternate between supplying a current from a current source to the first pair of coils and the second pair of coils so that only one of the pairs of coils is energized by the current source at a time. The four magnet embodiment has the advantage that the flow may be continuously monitored.

In yet another aspect of the invention, the flowmeter may comprise a tube through which the fluid flows. The tube has an inside surface, a portion of which is electrically insulated from the fluid. The magnetic generating means is disposed on opposite sides of the tube outside the tube and the primary electrodes are disposed on opposite sides of the tube, passing through the tube, and an electrically insulated from the tube. Similarly, the secondary electrodes are disposed on opposite sides of the tube, passing through the tube, and electrically insulated from the tube. Unlike the prior art, which attempted to ground out the background potentials in the fluid, both the primary electrodes and the secondary electrodes are insulated from the tube providing signal values to the signal processing means.

In another aspect, the invention may be configured as an insertion probe. An insertion probe is a probe inserted into the flow of fluid, rather than a sensing unit surrounding a tube. An insertion probe may be employed in measuring the velocity of fluids flowing in a pipe, if it is inserted through an opening in the pipe. However, an insertion probe may also be used to measure the velocity of a river, or even the speed of a ship as it passes through a body of water. Several types of magnets may be employed in the insertion probe configuration. These include electromagnets, ring magnets (with the electrodes disposed within the ring), and disk magnets (with the electrodes disposed outside of the disk).

The present invention may also provide a method of measuring the velocity of a fluid, such as a fluid flowing through a tube, relative to a point. A magnetic field perpendicular to the direction of fluid flow is generated, thereby inducing a voltage in the fluid perpendicular to the fluid velocity and perpendicular to the direction of the magnetic field. A total voltage across the portion of the fluid perpendicular to the direction of the magnetic field and perpendicular to the direction of fluid velocity is sensed. A background voltage across a portion of the fluid perpendicular to the direction of the total voltage is sensed. The voltage induced in the fluid flowing through the magnetic field is determined by subtracting the background voltage from the combined voltage. A velocity signal representative of the magnitude of the fluid velocity based on the induced voltage is generated.

In yet another aspect of the invention, employing four magnets, a first magnetic field is applied to the fluid, essentially orthogonal to the direction of fluid velocity. An induced voltage potential essentially orthogonal to both the first magnetic field and the direction of fluid velocity is sensed. A second magnetic field is then applied to the fluid, essentially orthogonal to both the first magnetic field and the direction of fluid velocity, and an induced voltage potential essentially orthogonal to both the second magnetic field and the direction of fluid velocity is sensed. The application of the first magnetic field and the second magnetic field alternate, as does the sensing of the induced voltages.

In each of the above-described aspects, the magnitude of the generated magnetic field may be measured using, for example, a hall effect sensor. A flux integrating coil may be used when the magnetic field is generated using electromagnetic coils. The measured magnetic field may be used to correct the velocity signal for any fluctuations in the magnetic field. The correction of the velocity signal may be accomplished digitally by programming the relevant Faraday's equation into a microprocessor and using an analog-to-digital converter to provide the magnitude of the magnetic field component (the direction being a predetermined constant) and solving the Maxwell's equation for velocity. The correction could also be accomplished using an analog circuit of the type commonly known to those skilled in the art of analog computer design.

It is an advantage of the present invention to provide a magnetic flowmeter that eliminates the effects of spurious voltage potentials.

It is also an advantage of the present invention to provide a magnetic flowmeter that employs a permanent magnet to continuously monitor fluid flow.

It is also an advantage of the present invention to provide a magnetic flowmeter that regularly counteracts the effects of triboelectric, and other spurious charges forming on sensing electrodes.

These and other advantages will become apparent from the following description of the invention taken in conjunction with the following drawings, although variations and modifications may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views.

Figure 1A:
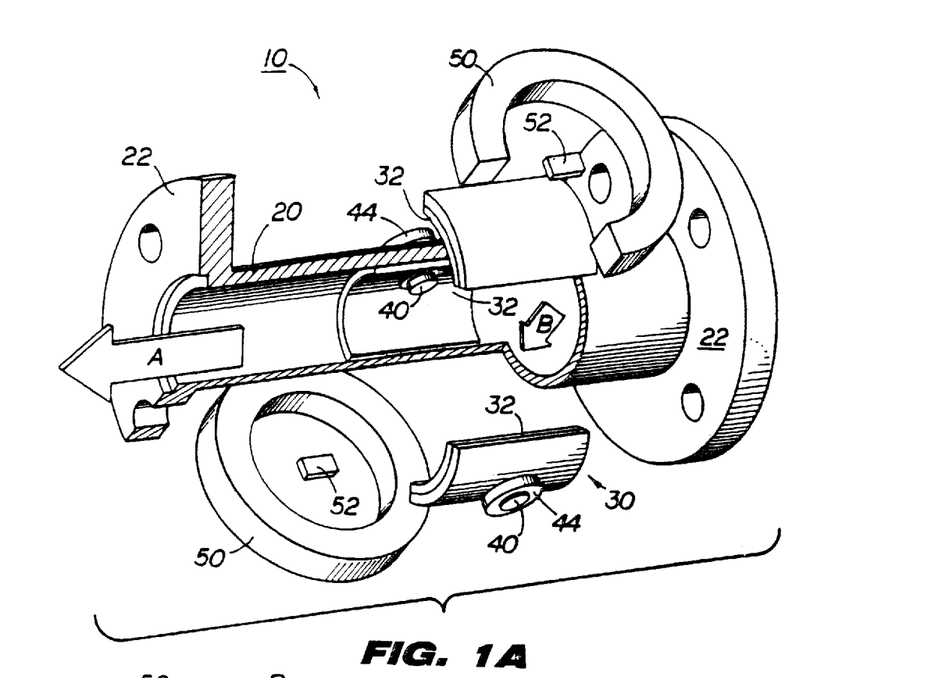
FIG. 1A is an exploded cut-away perspective view of a two magnet and two electrode embodiment of a flowmeter in accordance with the present invention.
Figure 1B:
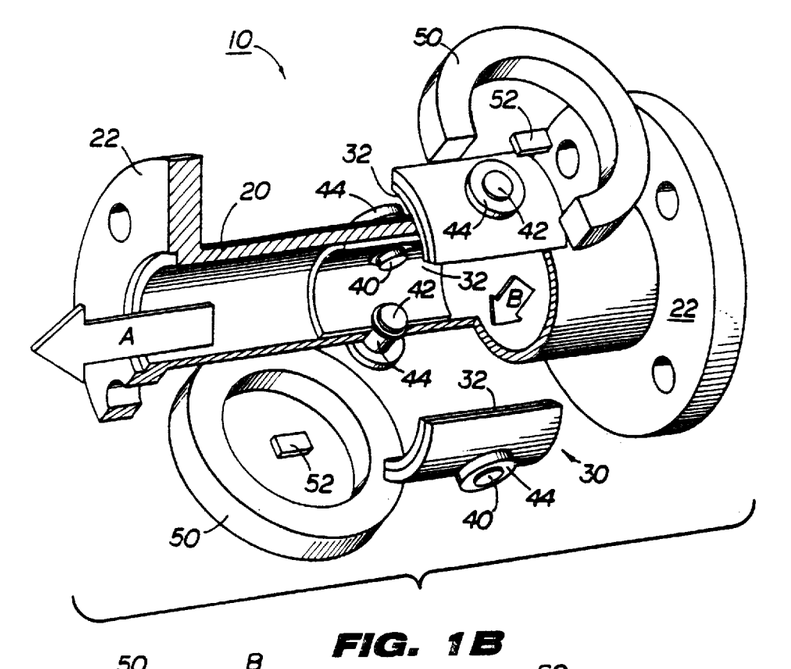
FIG. 1B is an exploded cut-away perspective view of a two magnet and four electrode embodiment of a flowmeter in accordance with the present invention.

In the embodiments shown in FIGS. 1A and 1B, the present invention 10 comprises a tube 20 through which the fluid to be measured flows. The tube terminates at each end with a flange 22 that is connectable in line to the piping system. Fluid may flow through the tube in direction A. However, this embodiment of the present invention can sense the velocity of fluid flowing in the opposite direction equally well.

A flow sensing unit 30 is disposed in a region between the flanges 22. The flow sensing unit 30 comprises an electrical insulating sleeve 32 disposed around a portion of the tube 20. The insulating sleeve 32 is applied to the inside surface of the tube 20 and electrically isolates the fluid from the tube 20 so that any voltage potential in the fluid will not be grounded by the tube 20.

Two magnetic coils 50 are disposed on opposite sides of the tube 20 and, preferably, the axial dimension of the insulating sleeve should be at least equal to the inside diameter of the coils 50 to ensure that none of the potential induced by the coils is grounded by the tube. The magnetic coils 50 are disposed so that they produce an essentially uniform magnetic field in a direction B transverse to the direction of fluid velocity A, thereby inducing a voltage potential along a line that is perpendicular to both the direction of the magnetic field B and the direction of fluid velocity A.

Two primary electrodes 40 are oppositely disposed transverse to both the direction of the magnetic field and the direction of fluid velocity A. The primary electrodes 40 are disposed so that they contact the fluid in the tube 20 and sense the voltage potential induced by the magnetic field. The electrodes penetrate the tube 20 and are electrically isolated from the tube 20 by insulating jackets 44. The primary electrodes 40 need not be perpendicular to the direction of the magnetic field B and the fluid velocity A. However, as they approach being perpendicular to these directions the range of the component of the induced potential sensed by the primary electrodes 40 approaches its maximum value, thereby maximizing the precision of the flowmeter.

In the embodiment shown in FIG. 1A, only one pair of electrodes 40 is in electrical contact with the fluid. This embodiment is practical in situations in which there is low background magnetic field intensity, or other background influences that would cause the voltage potential between the primary electrodes 40 to deviate from the voltage potential induced across the fluid as a result of its moving through the magnetic field.

In the embodiment shown in FIG. 1B, which would be used in situations where the two primary electrodes 40 would be likely to sense a voltage potential induced by outside influences (i.e. the background potential, or noise potential), two secondary electrodes 42 are oppositely disposed on a plane parallel to the direction of fluid velocity A and the direction of the magnetic field B to sense any background noise potential. The secondary electrodes 42, as shown, are disposed parallel to the direction of the magnetic field. Other orientations of the secondary electrodes 42 are possible, so long as they are not transverse to both the direction of the fluid velocity A and the direction of the magnetic field B. The secondary electrodes 42 are thereby disposed so that they do not sense the voltage potential induced by the magnets 50, but do sense any background potential. Like the primary electrodes 40, the secondary electrodes 42 penetrate the tube 20 and are electrically isolated from it by insulating jackets 44.

Because of the random nature of the background potential, the noise potential in the direction of the primary electrodes 40 is essentially the same as the noise potential in the direction of the secondary electrodes 42. If this embodiment is used in an environment with a polarized, or directional, background potential, the flowmeter must be calibrated to compensate for the directionality of the background potential.

In the embodiments of both FIG. 1A and FIG. 1B, the magnets 50 can be ether electromagnets or permanent magnets. If electromagnets are used, the magnets 50 would preferably comprise two coils with an equal number of turns and connected in series, thereby forming a "Helmholz coil" and generating a uniform magnetic field across the tube 20. To prevent reverse-field induced voltages, the inside diameter of the magnets 50 should be at least the inside diameter of the tube 20. Preferably, especially for use with smaller tubes, one half of the inside diameter of the magnet 50 should be at least the inside diameter of the tube 20.

Magnetic field sensors 52 (such as Hall effect sensors or, when electromagnets are used, flux integrating coils) are disposed near the magnets 50 to sense any variations in the magnetic field. The magnetic field sensors 52 allow the use of permanent magnets, whose magnetic fields tend to fluctuate over time, instead of electromagnets. Using permanent magnets confers the advantage of greatly reducing the power requirements of the flowmeter. This advantage both reduces energy costs and allows for the use of flowmeters in remote areas that do not have an electricity supply sufficient to power a conventional flowmeter. If the magnetic field sensors 52 are used with electromagnets, the overall accuracy of the flowmeter is improved.

Figure 2A:
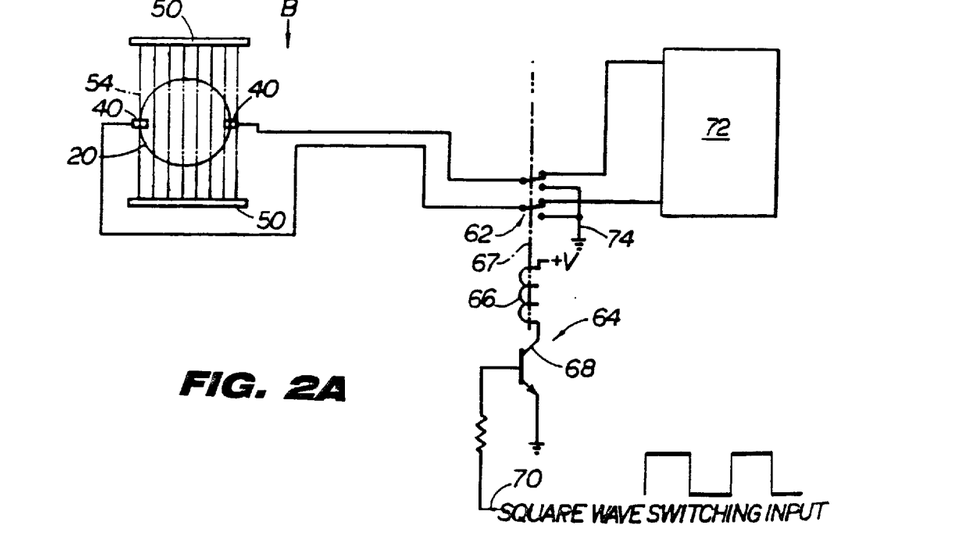
FIG. 2A is a schematic diagram of the flowmeter shown in FIG. 1A, showing the electrical connections between the electrodes and the signal processing means.
Figure 2B:
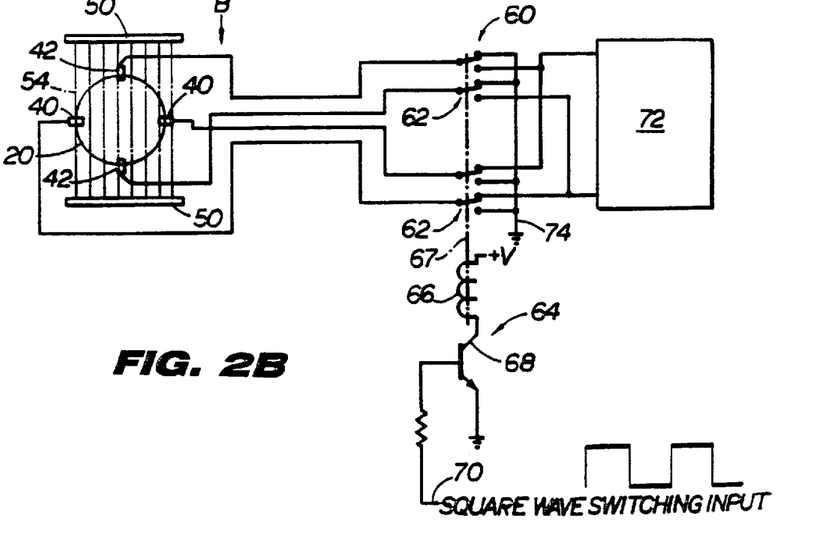
FIG. 2B is a schematic diagram of the flowmeter shown in FIG. 1B, showing the electrical connections between the electrodes and the signal processing means.

A schematic diagram of the tube 20 transverse to magnetic lines of force 54 induced by the magnets 50 is shown in FIGS. 2A and 2B. The potentials sensed by the primary electrodes 40 and the secondary electrodes 42 are relayed through a switching network 60 to a signal processing means 72. In one embodiment, the switching network 60 is comprises a plurality of switches 62 that are activated by a plunger 67 driven by a solenoid 66. The solenoid receives activation power from a transistor 68 having an oscillating switching input 70 to its gate. In an alternative preferred embodiment, the switching network 60 comprises a solid state electronic switching network of the type that would be obvious to one skilled in the art of designing electronic instrumentation.

The switching network 60 alternates between connecting the primary electrodes 40 to the signal processing means 72 while connecting the secondary electrodes 42 to ground 74 and connecting the secondary electrodes 42 to the signal processing means 72 while connecting the primary electrodes 40 to ground 74. The signal processing means 72 holds the value of the total potential sensed by the primary electrodes 40 while the value of the background potential is being sensed by the secondary electrodes 42. Once both potentials have been sensed, the signal processing means 72 subtracts the value of the background potential from the value of the total potential, thus resulting in the value of the potential induced in the fluid by the magnetic field. By periodically connecting the primary electrodes 40 and the secondary electrodes 42 to ground 74, any residual charge accumulating on the electrodes 40 & 42 is eliminated. The signal processing means 72 could comprise a voltage signal comparator (either analog or digital) of the type that would be obvious to one skilled in the art of designing electronic instrumentation.

Figure 3A:
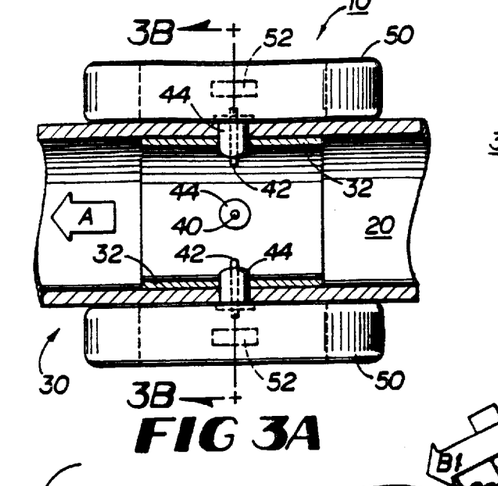
FIG. 3a is a side cross-sectional view of the two magnet embodiment of a flowmeter.
Figure 3B:
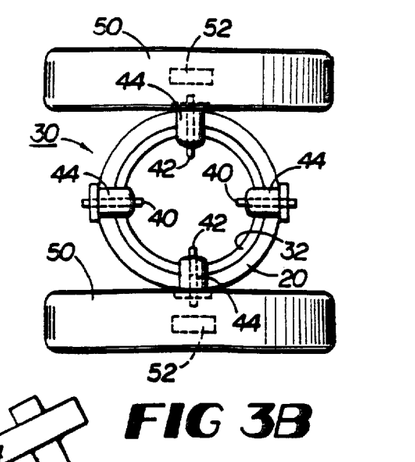
FIG. 3b is a cross-sectional view of the flowmeter of FIG. 3a, taken along line 3b—3b.

FIG. 3a is a cross-section view of the embodiment thus far described and FIG. 3b is a cross-sectional view taken along line 3b—3b in FIG. 3a. FIGS. 3a and 3b show the preferred dimensional relationship between the inside diameter of the magnets 50 and the length of the insulating sleeve 32, as well as the diameter of the tube 20.

Figure 4:
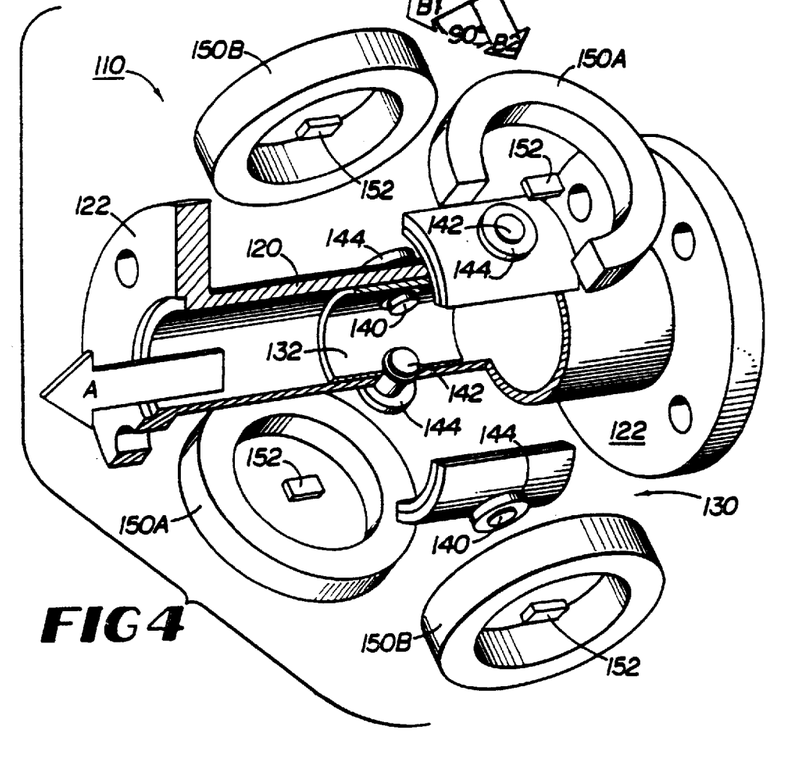
FIG. 4 is an exploded cut-away perspective view of a four magnet embodiment of a flowmeter in accordance with the present invention.

A four magnet embodiment 110 is shown in FIG. 4. The four magnet embodiment 110 comprises a tube 120 terminating at each end with a flange 122 that is connectable to the piping system to be monitored. Fluid may flow through the tube in direction A. However, this embodiment of the present invention can sense the velocity of fluid flowing in the opposite direction equally well. A flow sensing unit 130 is disposed in a region between the flanges 122. The flow sensing unit 130 comprises an electrically insulating sleeve 132 disposed around a portion of the tube 120. The insulating sleeve 132 electrically isolates the fluid from the tube 120 so that any voltage potential in the fluid will not be grounded by the tube 120.

Two pairs of electromagnetic coils, a first pair 150a and a second pair 150b, are disposed orthogonally to each other so that they produce an essentially uniform magnetic field in a directions B1 & B2, respectively, transverse to the direction of fluid velocity A. The magnetic field directions of B1 & B2 are essentially perpendicular to each other. A current supply switching means, similar to the switching means shown in FIG. 2, alternates between supplying a current from a current source to the first pair of coils 150a and the second pair of coils 150b.

In this embodiment, a magnetic field is always being applied to the fluid. This eliminates any delay associated with the decay of the magnetic field as would be experienced with the two-electromagnet embodiment (the two-electromagnet embodiment must wait until the induced magnetic field has fully decayed before sampling the background voltage). Because the magnetic field must be alternately turned on and turned off, this embodiment would only work with electromagnets, and would not work with permanent magnets. As with the two-magnet embodiment, magnetic field sensors 152 are disposed near the magnets 150 to sense any variations in the magnetic field.

Two primary electrodes 140 are oppositely disposed transverse to both the direction of the magnetic field B1 and the direction of fluid velocity A. The primary electrodes are disposed so that they contact the fluid in the tube and sense the voltage potential induced by the magnetic field. They also sense any voltage potential induced by outside influences (i.e. the background potential, or noise potential). The primary electrodes penetrate the tube 120 and are electrically isolated from the tube 120 by insulating jackets 144.

Two secondary electrodes 142 are oppositely disposed transverse to both the direction of the magnetic field B2 and the direction of fluid velocity A. In this embodiment, the secondary electrodes are disposed parallel to the direction of the magnetic field. Other orientations of the secondary electrodes 142 are possible, so long as they are not transverse to both the direction of the fluid velocity A and the direction of the magnetic field B. The secondary electrodes 142 are thereby disposed so that they do not sense the voltage potential induced by the magnets 150, but do sense any background potential. Like the primary electrodes 140, the secondary electrodes 142 penetrate the tube 120 and are electrically isolated from it by insulating jackets 144.

In this embodiment, the primary electrodes 140 sense the total voltage while the first pair of coils 150a is energized and the secondary electrodes 142 sense the background voltage. While second pair of coils 150b is energized, the secondary electrodes 142 sense the total voltage and the primary electrodes 140 sense the background voltage. In this way, both parameters are continually being sensed and fluid velocity is continually being monitored.

Figure 5A:
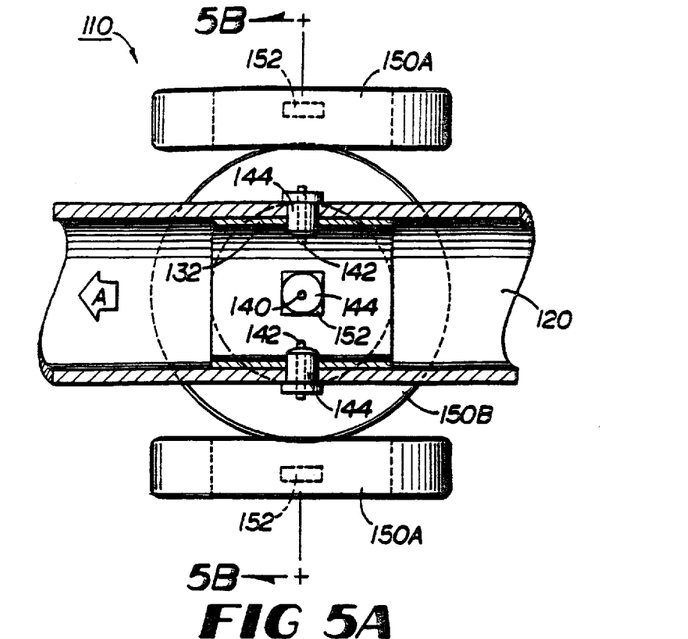
FIG. 5a is a side cross-sectional view of the four magnet embodiment of a flowmeter.
Figure 5B:
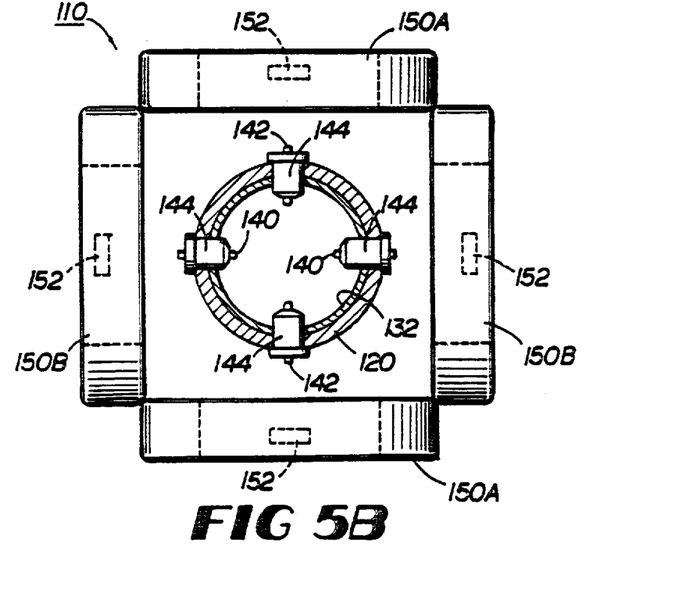
FIG. 5b is a cross-sectional view of the flowmeter of FIG. 5a, taken along line 5b—5b.

FIG. 5a is a cross-sectional view of the four magnet embodiment and FIG. 5b is a cross-sectional view taken along line 5b—5b in FIG. 5a. FIGS. 5a and 5b show the preferred dimensional relationship between the inside diameter of the magnets 150 and the length of the insulating sleeve 132, as well as the diameter of the tube 120.

Figure 6:
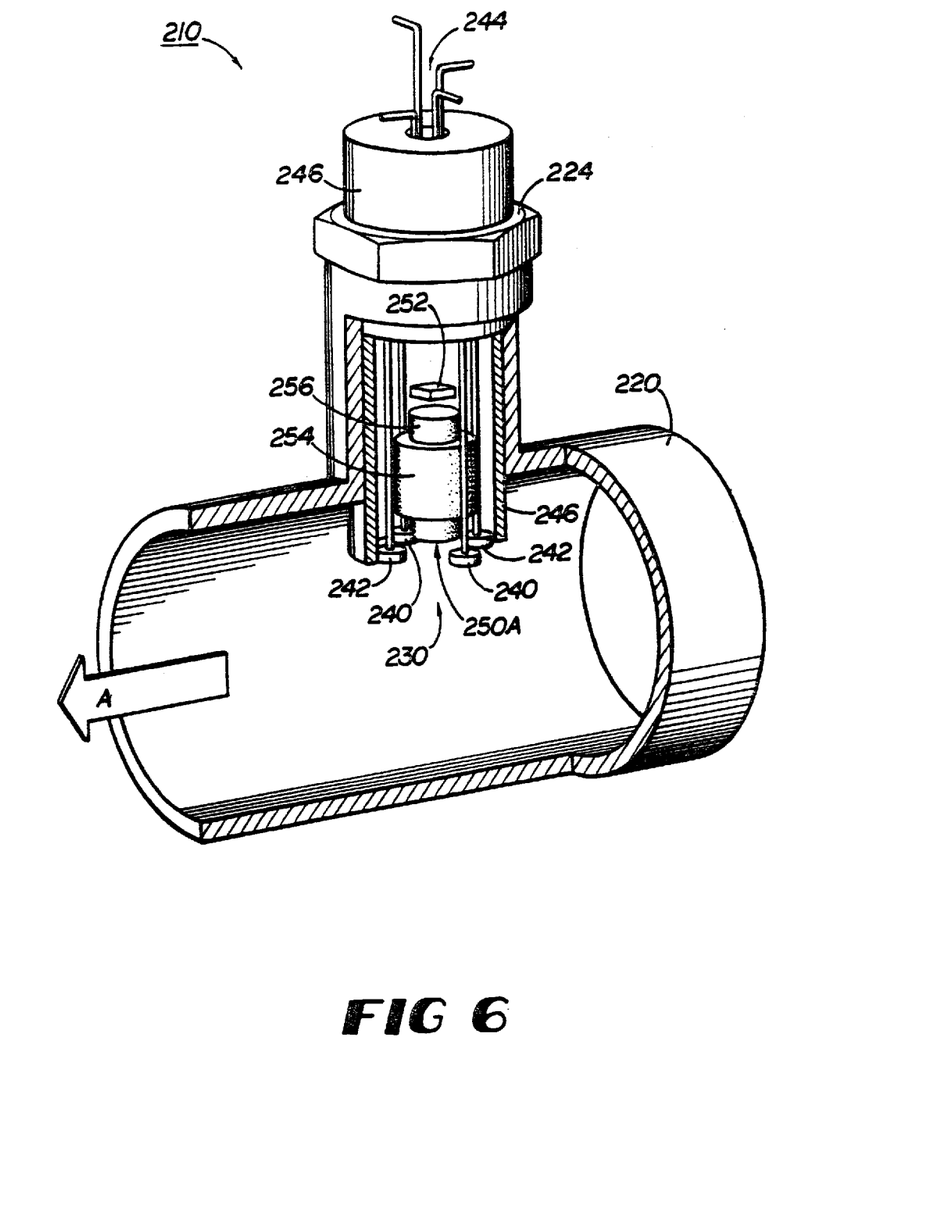
FIG. 6 is a cut-away perspective view of an insertion-probe embodiment of a flowmeter in accordance with the present invention, employing a cored electromagnet.
Figure 7:
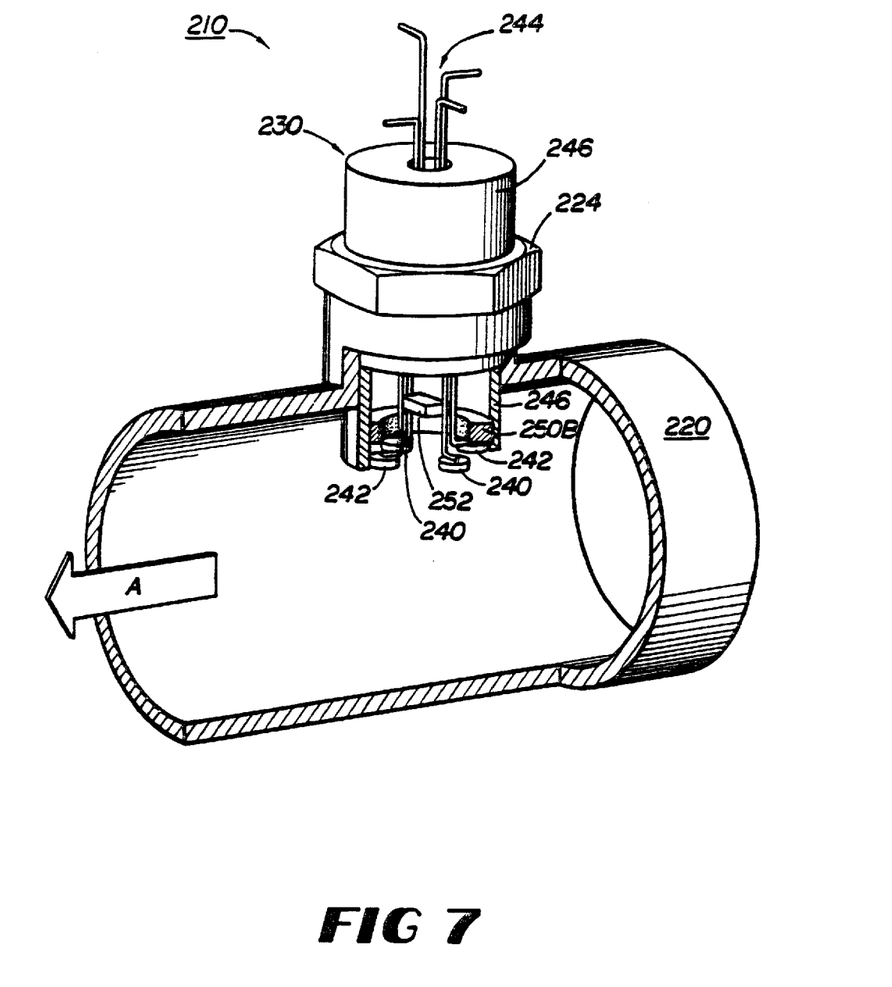
FIG. 7 is a cut-away perspective view of an insertion-probe embodiment of a flowmeter in accordance with the present invention, employing a ring magnet.
Figure 8:
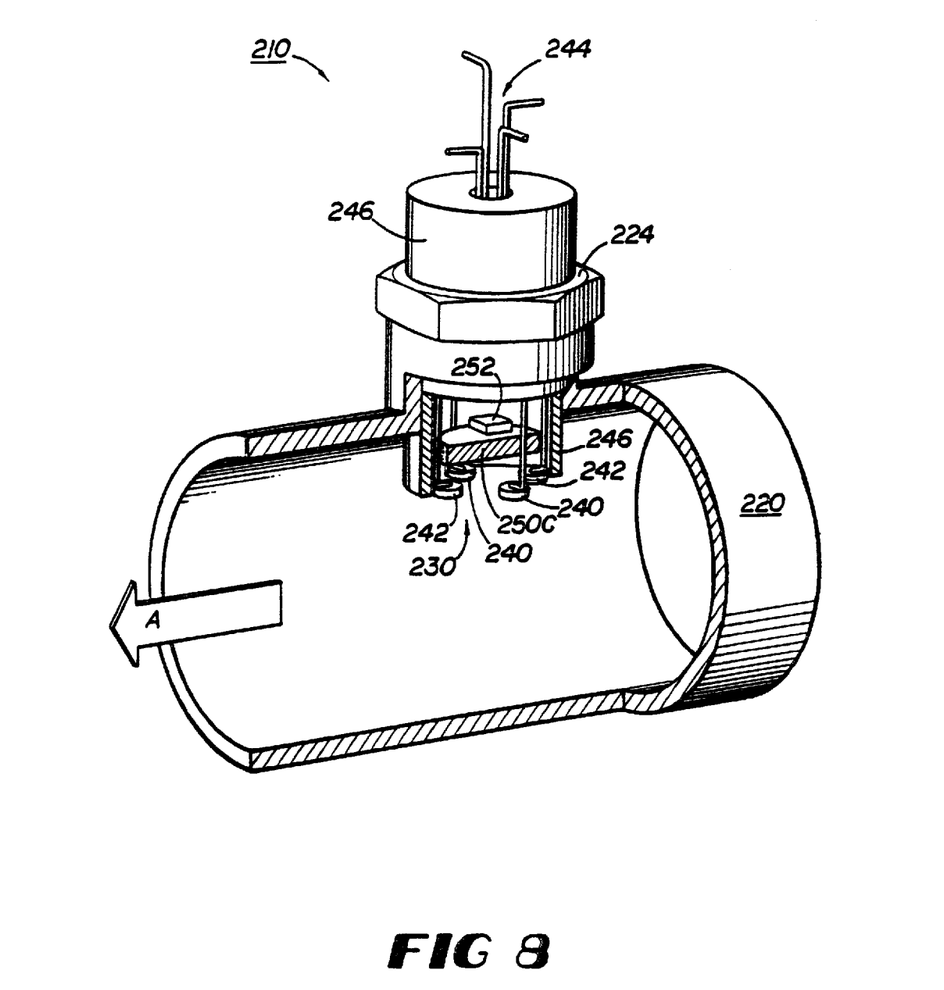
FIG. 8 is a cut-away perspective view of an insertion-probe embodiment of a flowmeter in accordance with the present invention, employing a disk magnet.

FIGS. 6–8 show the present invention 210 embodied in an insertion probe configuration. An insertion probe comprises a flow sensing unit 230 that is inserted into the stream of the flowing fluid. An insertion probe may be employed in measuring the velocity of fluids flowing in a pipe 220, as shown in FIGS. 6–8. However, an insertion probe is not limited to measuring fluid velocity in pipes. It may also be used to measure the velocity of a river, or even the speed of a ship as it passes through a body of water.

In the embodiments shown in FIGS. 6–8, the flow sensing unit 230 comprises a pair of opposed primary electrodes 240 which are transverse, preferably perpendicular, to the direction of fluid velocity. A pair of opposed secondary electrodes 242 are placed essentially in line with the direction of fluid velocity. A magnet 250a, b or c is placed so that it induces a magnetic field transverse to the direction of fluid velocity. An insulating shroud 246 is placed around the flow sensing unit 230 and the flow sensing unit 230 is inserted into a pipe 220 and held in place by a means 224 to affix the flow meter to the pipe 220. External contacts 224 electrically connect the electrodes 240, 242 to the signal processing means (shown in FIG. 2, item 72). The operation of the flowmeter is essentially the same as the operation described in the above embodiments, with any deviations being obvious to one skilled in the art of designing magnetic flowmeters.

In FIG. 6, the magnet 250a comprises an electromagnet having a coil 254 surrounding a core 256. A magnetic field sensor 252 is disposed adjacent the core 256. In FIG. 7, the magnet 250b is a ring magnet disposed around the electrodes 240, 242. The ring magnet could be a permanent magnet. In FIG. 8, the magnet 250c is a disk magnet disposed within the electrodes 240, 242.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A flowmeter for measuring the velocity of a fluid, comprising:
   a. means for producing a magnetic field transverse to the direction of fluid velocity thereby inducing a voltage potential in the fluid;
   b. at least two primary electrodes in electrical contact with the fluid, spaced apart along a line transverse to the direction of the magnetic field and transverse to the direction of the fluid velocity, said primary electrodes responsive to the induced voltage potential;
   d. signal processing means, responsive to said two electrodes, for generating a velocity signal representative of the magnitude of the velocity of the fluid; and
   e. means for periodically grounding said two electrodes, thereby eliminating any residual charge that builds up on said electrodes, wherein said magnetic field generating means comprises two spaced-apart electromagnetic coils having a common axis and the same current and wherein said coils are separated by a distance of about the radius of one of said coils.

2. The flowmeter of claim 1, further comprising magnetic sensor means for sensing the magnitude of the magnetic field across the fluid produced by said magnetic field producing means, and means in the signal processing means responsive to said magnetic sensor means for correcting the velocity signal for any fluctuations in the magnetic field produced by said magnetic field producing means.

3. The flowmeter of claim 1, wherein the magnetic field produced by said magnetic field producing means is essentially perpendicular to the direction of fluid velocity.

4. The flowmeter of claim 1, wherein the line along which the primary electrodes are spaced apart is essentially perpendicular to the direction of the magnetic field and perpendicular to the direction of the fluid velocity.

5. The flowmeter of claim 1, wherein said coils are connected in series.

6. The flowmeter of claim 1, further comprising a tube through which the fluid flows, the tube having an inside surface, a portion of which is electrically insulated from the fluid, wherein the magnetic field producing means is disposed on opposite sides outside said tube and wherein said electrodes are disposed on opposite sides of the tube, passing through said tube, and electrically insulated from said tube.

7. A flowmeter for measuring the velocity of a fluid, comprising:
   a. means for producing a magnetic field transverse to the direction of fluid velocity thereby inducing a voltage potential in the fluid;

b. at least two primary electrodes in electrical contact with the fluid, spaced apart along a line transverse to the direction of the magnetic field and transverse to the direction of the fluid velocity, said primary electrodes responsive to the induced voltage potential;

d. signal processing means, responsive to said two electrodes, for generating a velocity signal representative of the magnitude of the velocity of the fluid;

e. means for periodically grounding said two electrodes, thereby eliminating any residual charge that builds up on said electrodes; and f. a pair of spaced apart secondary electrodes in electrical contact with the fluid and wherein said magnetic field generating means comprises a first pair of spaced-apart electromagnetic coils and a second pair of spaced-apart electromagnetic coils, oriented so that a magnetic field generated by said second pair of coils is perpendicular to the magnetic field generated by said first pair of coils, and wherein the direction of the fluid velocity is perpendicular to the magnetic fields generated by both said first pair of coils and said second pair of coils, so that the primary electrodes are responsive to the voltage potential induced by the first pair of electromagnetic coils and the secondary electrodes are responsive to the voltage potential induced by the second pair of electromagnetic coils.

8. The flowmeter of claim 7, further comprising switching means to alternate between supplying a current from a current source to said first pair of coils and said second pair of coils so that only one of said pairs of coils is energized by said current source at a time.

9. The flowmeter of claim 7, wherein said secondary electrodes are disposed on a line perpendicular to the direction of the fluid velocity.

10. The flowmeter of claim 7, wherein said secondary electrodes are disposed on a line parallel to the direction of the fluid velocity.

11. The flowmeter of claim 7, wherein the fluid flows through a pipe and said primary electrodes and said secondary electrodes are disposed on a probe inserted through an opening defined by the pipe.

12. A flowmeter for measuring the velocity of a fluid, comprising:

a. means for producing a magnetic field transverse to the direction of fluid velocity thereby inducing a voltage potential in the fluid;

b. at least two primary electrodes in electrical contact with the fluid, spaced apart along a line transverse to the direction of the magnetic field and transverse to the direction of the fluid velocity, said primary electrodes responsive to the induced voltage potential;

d. signal processing means, responsive to said two electrodes, for generating a velocity signal representative of the magnitude of the velocity of the fluid;

e. means for periodically grounding said two electrodes, thereby eliminating any residual charge that builds up on said electrodes; and f. a tube through which the fluid flows, the tube having an inside surface, a portion of which is electrically insulated from the fluid, wherein the magnetic field producing means is disposed on opposite sides outside said tube and wherein said electrodes are disposed on opposite sides of the tube, passing through said tube, and electrically insulated from said tube, wherein said magnetic field generating means comprises two spaced-apart electromagnetic coils having a common axis and electrically connected in series and wherein the inside diameter of said tube is about the inside diameter of one of said coils.

13. The flowmeter of claim 12, wherein the length of the inside surface insulated portion of said tube is about the inside diameter of one of said coils.

14. A flowmeter for measuring the velocity of a fluid, comprising:

a. means for producing a magnetic field transverse to the direction of fluid velocity thereby inducing a voltage potential in the fluid;

b. at least two primary electrodes in electrical contact with the fluid, spaced apart along a line transverse to the direction of the magnetic field and transverse to the direction of the fluid velocity, said primary electrodes responsive to the induced voltage potential;

d. signal processing means, responsive to said two electrodes, for generating a velocity signal representative of the magnitude of the velocity of the fluid;

e. means for periodically grounding said two electrodes, thereby eliminating any residual charge that builds up on said electrodes;

wherein the fluid flows through a pipe and said electrodes are disposed on a probe inserted through an opening defined by the pipe.

15. The flowmeter of claim 14, wherein said means for producing a magnetic field comprises a permanent magnet.

16. A flowmeter for measuring the velocity of a fluid, comprising:

a. at least one permanent magnet that produces a magnetic field transverse to the direction of fluid velocity thereby inducing a voltage potential in the fluid;

b. two primary electrodes in electrical contact with the fluid, spaced apart along a line transverse to the direction of the magnetic field and transverse to the direction of the fluid velocity, said primary electrodes responsive to the induced voltage potential and any background voltage potential across the fluid;

c. two secondary electrodes in electrical contact with the fluid, spaced apart along a plane, the plane being parallel to the direction of the magnetic field and also parallel to the direction of the fluid velocity, said secondary electrodes responsive to any background voltage potential therebetween;

d. means for alternately grounding said primary electrodes while sensing the voltage potential across said secondary electrodes and grounding said secondary electrodes while sensing the voltage potential across said primary electrodes, thereby eliminating any residual charge that builds up on said primary electrodes and said secondary electrode; and e. signal processing means, responsive to said primary electrodes and said secondary electrodes, for subtracting the background voltage potential from the induced voltage potential, thereby generating a velocity signal representative of the magnitude of the velocity of the fluid.

17. A flowmeter for measuring the velocity of a fluid flowing through a pipe, comprising:

a. a probe inserted into an opening defined by the pipe;

b. at least one permanent magnet, disposed on said probe, that produces a magnetic field transverse to the direction of fluid velocity thereby inducing a voltage potential in the fluid;

c. two primary electrodes, disposed on said probe, in electrical contact with the fluid, spaced apart along a line transverse to the direction of the magnetic field and transverse to the direction of the fluid velocity, said primary electrodes responsive to the induced voltage potential and any background voltage potential across the fluid;

d. two secondary electrodes, disposed on said probe, in electrical contact with the fluid, spaced apart along a plane, the plane being parallel to the direction of the magnetic field and also parallel to the direction of the fluid velocity, said secondary electrodes responsive to any background voltage potential therebetween;

e. means for alternately grounding said primary electrodes while sensing the voltage potential across said secondary electrodes and grounding said secondary electrodes while sensing the voltage potential across said primary electrodes, thereby eliminating any residual charge that builds up on said primary electrodes and said secondary electrode; and f. signal processing means, responsive to said primary electrodes and said secondary electrodes, for subtracting the background voltage potential from the induced voltage potential, thereby generating a velocity signal representative of the magnitude of the velocity of the fluid.

18. A method of measuring the velocity of a fluid relative to a point, comprising the steps of:

a. generating a magnetic field perpendicular to the direction of fluid flow, thereby inducing a voltage in the fluid perpendicular to the fluid velocity and perpendicular to the direction of the magnetic field;

b. sensing, with two oppositely disposed primary electrodes, a total voltage across the portion of the fluid perpendicular to the direction of the magnetic field and perpendicular to the direction of fluid velocity;

c. sensing, with two oppositely disposed secondary electrodes, a background voltage across a portion of the fluid perpendicular to the direction of the total voltage;

d. determining the voltage induced in the fluid flowing through the magnetic field by subtracting the background voltage from the combined voltage;

e. generating a velocity signal representative of the magnitude of the fluid velocity based on the induced voltage; and f. periodically grounding said primary electrodes and said secondary electrodes, thereby eliminating any residual charge that builds up on said primary electrodes and said secondary electrodes.

19. The method of claim 18, further comprising the steps of alternately:

a. applying a first magnetic field, essentially orthogonal to the direction of fluid velocity, to the fluid and sensing an induced voltage potential essentially orthogonal to both the first magnetic field and the direction of fluid velocity; and b. applying a second magnetic field, essentially orthogonal to both the first magnetic field and the direction of fluid velocity, to the fluid and sensing an induced voltage potential essentially orthogonal to both the second magnetic field and the direction of fluid velocity.

20. The method of claim 18 further comprising the steps of measuring the magnitude of the generated magnetic field and correcting the velocity signal for any fluctuations in the magnetic field.

* * * * *